United States Patent [19]

Koshi

[11] Patent Number: 5,008,951
[45] Date of Patent: Apr. 16, 1991

[54] IMAGE INFORMATION ENCODING/DECODING DEVICE

[75] Inventor: Yutaka Koshi, Kanagawa, Japan

[73] Assignee: Fuji Xerox, Tokyo, Japan

[21] Appl. No.: 399,932

[22] Filed: Aug. 29, 1989

[30] Foreign Application Priority Data

Sep. 2, 1988 [JP]  Japan ................................ 63-221181

[51] Int. Cl.$^5$ ............................................. G06K 9/36
[52] U.S. Cl. ..................................... 382/56; 358/261.1
[58] Field of Search ................ 382/41, 56; 358/261.1, 358/261.2, 262.1, 263

[56] References Cited

U.S. PATENT DOCUMENTS

| | | | |
|---|---|---|---|
| 3,941,922 | 3/1976 | Tsuchiya et al. ................ | 358/261.1 |
| 4,096,520 | 6/1978 | Furuta ............................. | 358/261.1 |
| 4,494,151 | 1/1985 | Liao ................................. | 358/261.1 |
| 4,597,016 | 6/1986 | Nakamura et al. ............. | 358/261.1 |
| 4,679,094 | 7/1987 | Rutherford et al. ............ | 358/261.1 |
| 4,684,923 | 8/1987 | Koga ............................... | 358/261.1 |
| 4,688,100 | 8/1987 | Haganuma et al. ............. | 358/261.1 |
| 4,870,498 | 9/1989 | Schoon ............................ | 358/261.1 |
| 4,888,645 | 12/1989 | Mitchell et al. ................. | 358/261.1 |
| 4,926,266 | 5/1990 | Kurosawa ....................... | 382/56 |

*Primary Examiner*—Michael Razavi
*Attorney, Agent, or Firm*—Finnegan, Henderson, Farabow, Garrett and Dunner

[57] ABSTRACT

An image information processing device for performing two-dimensional encoding and decoding processings comprises an image data buffer memory, an image/run-length converting circuit, two run-length buffers, an encoding/decoding line shift-point address generating circuit, a reference line shift-point address generating circuit, pipeline-connected $a_2$, $a_1$ and $a_0$ registers, pipeline connected $b_2$, $b_1$ and $b_0$ registers, a mode/run-length detecting logic circuit, a control circuit, and a code word assigning/detecting circuit. Each of the two run-length buffers may consist of a first-in-first-out circuit.

5 Claims, 11 Drawing Sheets

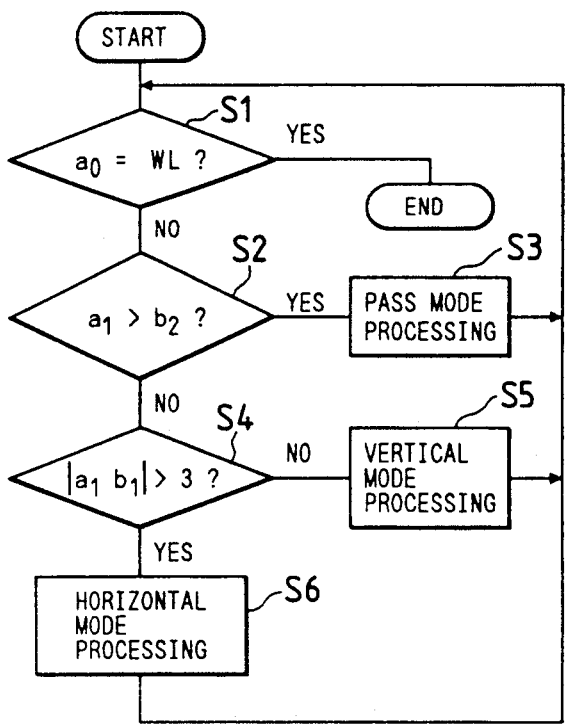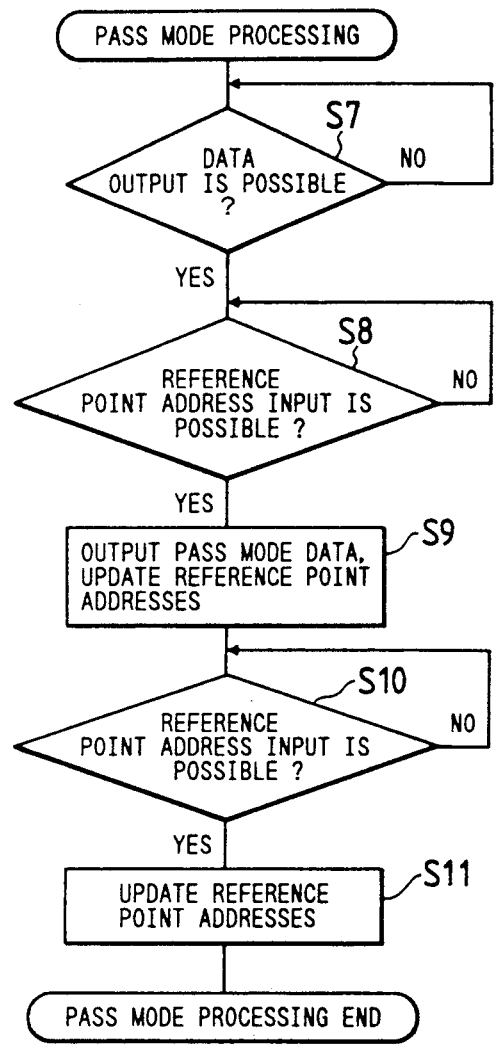

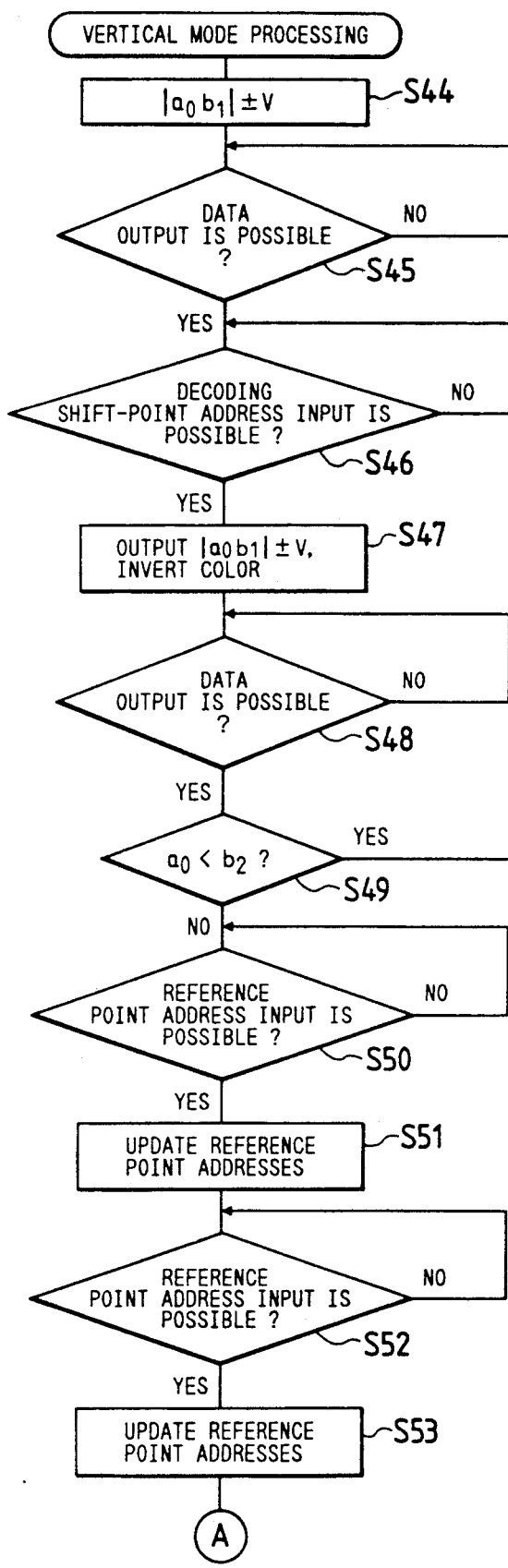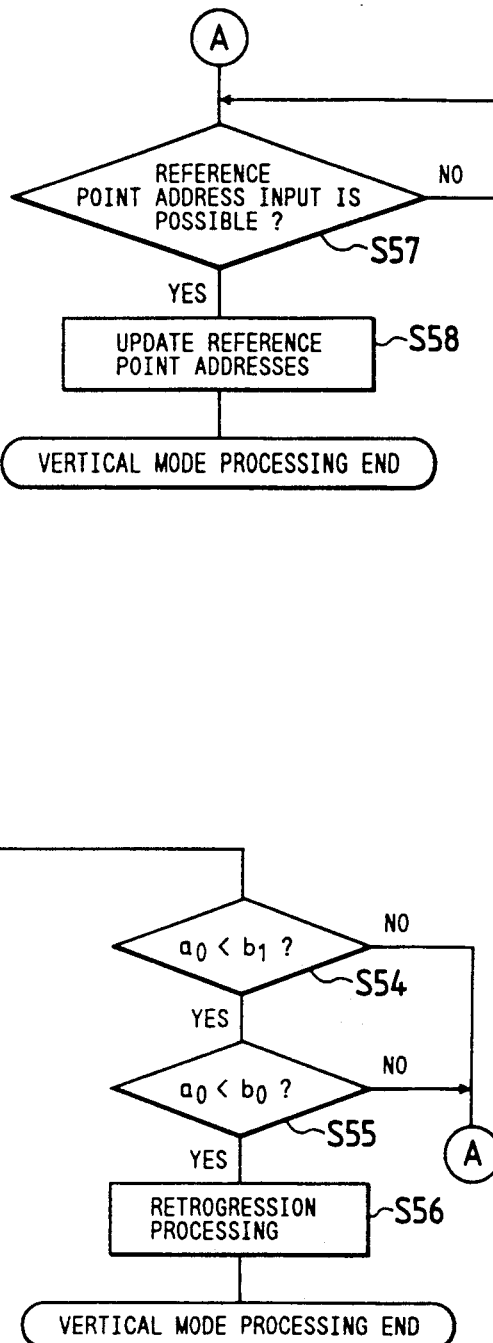
FIG. 10

IMAGE INFORMATION ENCODING/DECODING DEVICE

BACKGROUND OF THE INVENTION

The present invention related to an image information encoding/decoding device for carrying out encoding and decoding in accordance with the MH system, MR system or MMR system that are international standard systems, and more particularly to an image information encoding/decoding device for carrying out two-dimensional encoding and decoding by switching the control mode and the data paths of a single circuit.

Image-information-handling devices such as facsimile equipment and an image filing device usually employ some kind of encoding to carry out efficient transmission or storage of image information. In connection with this, there have been known many encoding/decoding systems. In particular, as international standard systems, there are specified the MH system and the MR system by CCITT Report T4 and there is specified the MMR encoding system by CCITT Report T6.

In carrying out encoding and decoding in accordance with the above-mentioned international standard systems, if the transmission speed of encoded information of the image information encoding/decoding device is relatively small to a degree of telephone lines, as in facsimile equipment, there will occur no particular difficulty even when software processing is carried out by the use of a microcomputer. However, in devices such as an image filing device that require high-speed processing, it becomes necessary to construct a part or the entirety of a encoding and a decoding device with hardware dedicated to that purpose. An example of such a device is the encoding device disclosed in Japanese Patent Application Laid-Open No. 122282/1984 whose block diagram is shown in FIG. 14.

Before moving to describe the operation of the prior art encoding device shown in FIG. 14, a description of "mode information" is in order. In the MR and MMR systems, shift points (picture elements at which a change from white to black or vice versa occurs) in binary image information of a scanning line currently under processing (referred to as encoding line in the case of encoding and decoding line in the case of decoding hereinafter) and shift points in binery image information of a reference line whose encoding or decoding has already been completed, are detected and compared with each other. Encoding and decoding are carried out taking into account which one of a vertical mode, horizontal mode and pass mode of operation is applicable to the relation between these two kinds of binary image information. That the reference line is normally a scanning line which has already been encoded or decoded and is adjacent to a current scanning line.

The above-mentioned three operation modes will now be described by making reference to FIG. 13. It is to be noted that encoding or decoding proceeds from left to right in the figure.

Suppose that a shift point which will serve as a starting point on an encoding line is called $a_0$, a first shift point to the right of the shift point $a_0$ on the encoding line is defined as $a_1$, a first shift point to the right of $a_1$ on the encoding line is defined as $a_2$, a shift point on a reference line to the right of $a_0$ and being the first to have color information opposite to that of $a_0$ is defined as a reference point $b_1$, and a first shift point to the right of $b_1$ on the reference line is defined as a reference point $b_2$. If the reference point $b_2$ finds itself to the left of the shift point $a_1$ as is the case shown in FIG. 13(a), the situation is called a pass mode P. In this case, since the information on the reference line cannot be utilized for data compression, in order to carry out encoding in the vertical or horizontal mode, addresses of the shift points are changed so as to be associated with the symbols with a prime mark attached, as shown in FIG. 13(a). In this case, the address of new $a_0$ is given the address of $b_2$ prior to the change.

When the distance between the shift point $a_1$ and the reference point $b_1$ is equal to or smaller than 3 picture elements, that is $|a_1b_1| \leq 3$, as shown in FIG. 13(b), the situation is called a vertical mode V. Based on the judgment on the relative distance between the point $a_1$ and $b_1$, and whether $a_1$ is on the right hand side or on the left-hand side of $b_1$, one of following code words is generated. First, when $a_1$ is directly below $b_1$, namely $|a_1b_1|=0$, a code word V(0) is generated, and when $a_1$ is on the right-hand side of $b_1$ and $|a_1b_1|=1$, $|a_1b_1|=2$ or $|a_1b_1|=3$, a code word VR(1), VR(2) or VR(3) is generated, respectively. Similarly, when $a_1$ is on the left-hand side of $b_1$ and there holds $|a_1b_1|=1$, $|a_1b_1|=2$ or $|a_1b_1|=3$, a code word VL(1), VL(2) or VL(3) is generated, respectively. In other words, when $|a_1b_1| \leq 3$ holds, it is judged that there exists a vertical correlation and the boundary deviation of the current scanning line from the reference line is encoded.

When $|a_1b_1|>3$ holds, the situation is called a horizontal mode H, and based on the relative distances between $a_0$ and $a_1$, and $a_1$ and $a_2$, code words are generated in accordance with an one-dimensional encoding system. Namely, when $|a_1b_1|>3$, it is regarded that there is no vertical correlation, one-dimensional encoding, instead of two-dimensional encoding, is carried out, and a code word consisting of two run-length data and a symbol "H" attached at the head and indicating the horizontal mode is output.

Further, according to the specifications of the aforementioned Reports, the vertical mode is allowed to have at most ±3 picture elements as the deviation between $a_1$ and $b_1$, so that when an encoding pertaining to a certain shift point has been completed and the next encoding is about to start, there sometimes occurs a so-called retrogression of the reference point in which $b_1$ is moved to the left side of its former position. For instance, if an encoding has been carried out under the condition that the shift points are located as shown in FIG. 13(c) (without primes), the shift points for the next encoding should be, by definition, located at the positions with the primes on the respective symbols, where the position of $b_1$ is moved to occupy a position to the left of its former position. This is what is called the retrogression of the reference point.

It should be noted in the above description that the symbol $|a_1b_1|$ means the absolute value of the difference between the address of the point $a_1$ and the address of the point $b_1$. This notation will be used also in what follows.

Now, the construction of the two-dimensional encoding device shown in Japanese Patent Application Laid-Open No. 122282/1984 mentioned above is as given in FIG. 14, and its operation is roughly as follows. Run-length data of an encoding scanning line and a reference scanning line are sequentially written in and read from an encoding scanning line memory 131 and a reference scanning line memory 132, respectively. A gate logic 133 computes addresses of the shift points $a_0$, $a_1$, $a_2$, $b_1$ and $b_2$ by sequentially adding run-length data that are read from the memories 131 and 132, and stores them in registers 135, 136, 137, 138 and 139, respectively. A feature judging logic 140 judges the current mode from the relative positions of the shift-point addresses, and outputs the mode data. The mode data is sent through a mode buffer 141 to an output logic 142 where it is converted to the cord word to be output. A drive sequencer 134 executes the control of each circuit.

Further, in Japanese Patent Application Laid-Open No. 190779/1984, there is also mentioned to carry out two-dimensional encoding while making reference to run-length information of a reference line that is stored in a run-length buffer memory.

In order to recover the original form from encoded image information it is necessary to carry out decoding processing. As such a counterpart decoding device to the two-dimensional encoding, there has been known Japanese Patent Application Laid-Open, No. 133778/1986, which intends to carry out decoding processing by providing a buffer memory for temporarily storing run-length data, and using software executed by a microprocessor Moreover, the present inventor proposed previously an image information encoding/decoding device for carrying out encoding and decoding processings at high speed and with small circuit scale by switching the control mode and the data paths of a common circuit (see Japanese Patent Application Laid-Open No. 25672/1989).

In the encoding device shown in FIG. 14, however, there are such problems as will be described below. Namely, it is necessary to carry out mode judging when a previous encoding has been completed and the next encoding is to be started. For that purpose, until establishing connection between the registers 135-139 and the encoding scanning line memory 131 and the reference scanning line memory 132 corresponding to the previous encoding mode, contents of the registers 135-139 should not be updated. This gives rise to a problem that the control required is complicated and that the processing takes a long time. To be more specific, when the previous encoding mode was the vertical mode V, the following procedure must follow: first the contents of the register 136 are stored in the register 135 by connecting those registers, then the contents of the register 137 are stored in the register 136 by connecting those registers, next, the contents of the register 137 and the run-length information stored in the encoding scanning line memory 131 are added by connecting them through the gate logic 133, and finally the result of addition is stored in the register 137. Further, when the previous encoding mode was the pass mode P, the contents of the register 139 is stored in the register 135 by connecting those registers. The contents of the registers 138 and 139 are updated in accordance with the definition of the reference point $b_1$ after the register 135 has been updated.

As described above, the image information encoding/decoding device shown in FIG. 14 takes a long time to update the contents of the registeres, which processing is required for the next encoding.

Although, in Japanese Patent Application Laid-Open No. 190779/1984, there appears a passage describing execution of the two-dimensional encoding by making reference to run-length information of a reference line stored in a run-length data buffer memory, no specific constitution is revealed therein.

The situation is similar for the decoding device. In Japanese Patent Application Laid-Open No. 133778/1986, there is no description about a specific constitution for obtaining run-length information of a decoding line from run-length information of a reference line stored in a run-length data buffer memory and mode information.

Moreover, Japanese Patent Application Laid-Open No. 25672/1989 proposed by the present inventor relates mainly to the MH encoding system, namely, one-dimensional encoding system. Although it gives an example in which the invention is applied to the two-dimensional encoding system such as the MR encoding system, it is required to separately provide a means for detecting mode information in the case of two-dimensional encoding, and a means for detecting run-length information in the case of two-dimensional decoding. Therefore, there is a problem that the scale of circuit becomes large.

SUMMARY OF THE INVENTION

The present invention is for solving the above-mentioned problems, and hence it is an object of the present invention to provide an image information encoding/decoding device which is capable of carrying out two-dimensional encoding and decoding processings at high speed and with small circuit scale.

In order to achieve the aforementioned object, an image information encoding/decoding device of the present invention comprises: an image data buffer memory, an image/run-length converting circuit, two run-length buffers, an encoding/decoding line shift-point address generating circuit, a reference line shift-point address generating circuit, pipeline-connected $a_2$, $a_1$ and $a_0$ registers, pipeline-connected $b_2$, $b_1$ and $b_0$ registers, a mode/run-length detecting logic circuit, a control circuit, and a code word assigning/detecting circuit.

With the constitution as described above, the encoding line shift-point addresses or the decoding line shift-point addresses can be generated independently of and simultaneously with the reference line shift-point addresses. Since the registers for storing the shift-point addresses are pipeline-connected, high-speed processing becomes possible. Moreover, because encoding and decoding can be performed by simple switching of the control mode and the data paths of a single circuit, it is possible to reduce the circuit scale.

Other and further objects, features and advantages of the invention will appear more fully from the following description taken in connection with the accompanying drawings.

BRIEF DESCRIPTION OF THE DRAWINGS

FIG. 3 is a diagram showing an overall flow chart of an encoding processing;

FIG. 4 is a diagram showing a flow chart for the pass mode in the encoding processing;

FIG. 10 is a diagram showing a flow chart for the vertical mode in the decoding processing;

DESCRIPTION OF THE PREFERRED EMBODIMENTS

Figure 1:
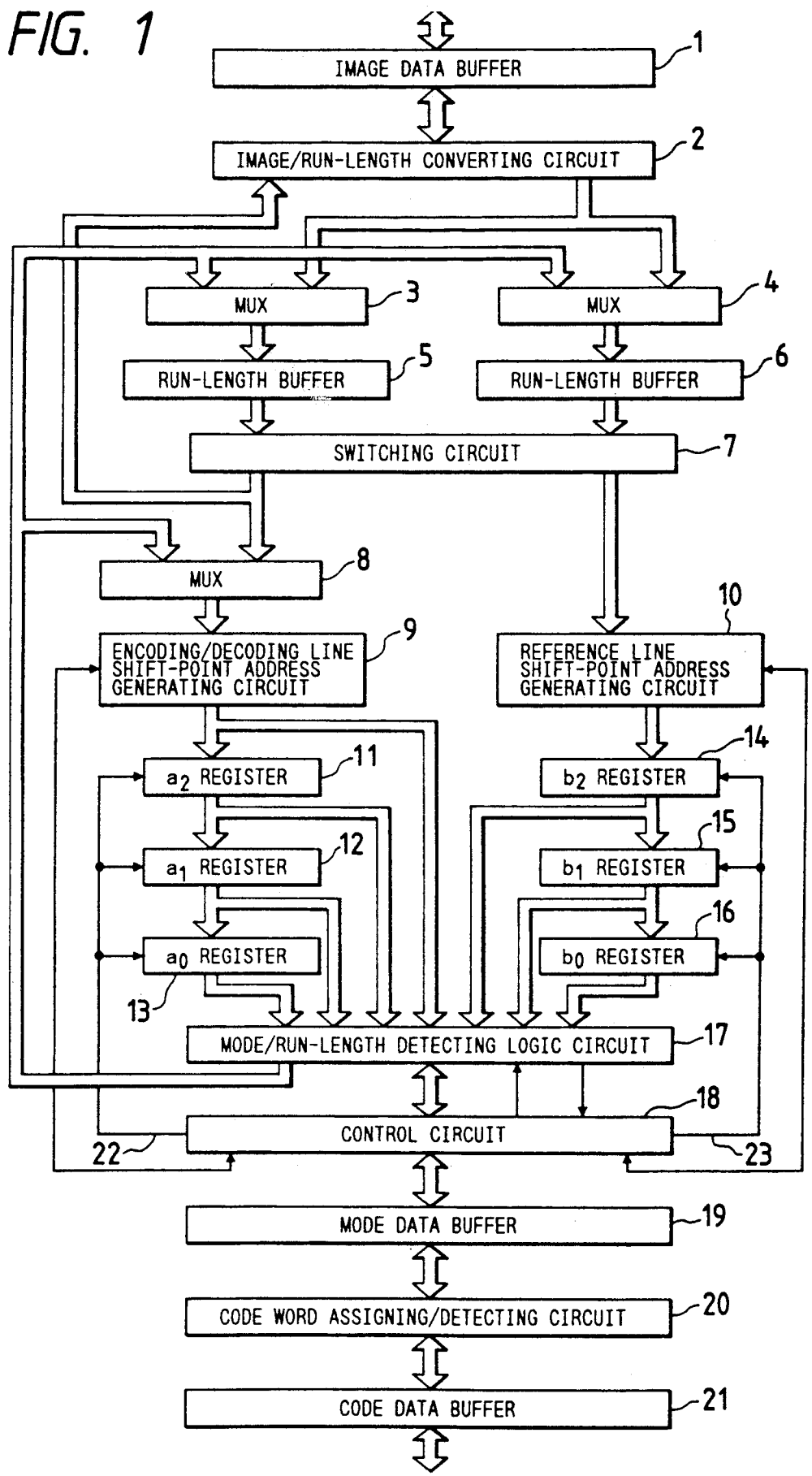
FIG. 1 is a diagram showing the constitution of an image information encoding/decoding device in accordance with an embodiment of the present invention.

Referring to the drawings, embodiments of the present invention will be described in the following.

FIG. 1 is a diagram showing the constitution of an image information encoding/decoding device according to an embodiment of the present invention. In the figure, reference numeral 1 denotes an image data buffer memory which receives image data from an image memory (not shown) in an encoding operation, and outputs image data to the image memory in a decoding operation. Reference numeral 2 denotes an image/run-length converting circuit which converts the image data provided from the image data buffer 1 to run-length data in the encoding operation, and converts run-length data to the image data in the decoding operation. The circuit 2 is publicly known. Reference numerals 3 and 4 represent multiplexers for selecting run-length data to be input to respective run-length buffers 5 and 6. Each of the run-length buffers 5 and 6 stores run-length data of one scanning line. In one of the run-length buffers 5 and 6 there is stored run-length data of an encoding line or a decoding line, whereas in the other run length buffer there is stored run-length data of a reference line. The constitution of the run-length buffers 5 and 6 will be described later. Reference numeral 7 denotes a switching circuit which supplies the run-length data of the encoding line or the decoding line, among the run-length data stored in the run-length buffers 5 and 6, to an encoding/decoding line shift-point address generating circuit 9 via a multiplexer 8, and supplies the run-length data of the reference line to a reference line shift-point address generating circuit 10. The encoding/decoding line shift-point address generating circuit 9 which in the encoding operation generates shift-point address of the encoding line by sequentially adding the run-length data of the encoding line, and generates shift-point addresses of the decoding line by sequentially adding the decoded run-length data. The reference line shift-point address generating circuit 10 generates shift-point addresses of the reference line by sequentially adding run-length data of the reference line. Reference numerals 11, 12 and 13 denote $a_2$, $a_1$ and $a_0$ registers, respectively, where the shift-point addresses of the encoding line and the decoding line are stored in the encoding and decoding operations, respectively. These three resisters 11, 12 and 13 are pipe-line connected. Accordingly, the contents of the registers 11, 12 and 13 are updated simultaneously in one step by a single clock which is output from a control circuit 18 to a signal line 22. Reference numerals 14, 15 and 16 denotes $b_2$, $b_1$ and $b_0$ resisters, respectively, where the shift-point addresses of the reference line are stored. Here, the $b_0$ register 16 is a feature of the present device, which is provided to facilitate the processings to be executed in carrying out the next encoding of a pass mode, and in the occurrence of a retrogression of a reference point. The details of the $b_0$ register 16 will be given later. These three registers 14, 15 and 16 are also pipeline-connected. Consequently, the contents of the registers 14, 15 and 16 are updated simultaneously in one step by a single clock which is output from the control circuit 18 to a signal line 23. Reference numeral 17 represents a mode/run-length detecting logic circuit which outputs mode data by detecting a current mode from the positional relationship between the shift points of the encoding line and the reference line when the system is in the encoding operation, and generates the run-length data from input mode data when the system is in the decoding operation. Reference numeral 18 denotes the control circuit which switches the control mode and the data path between the encoding and decoding operations, and also controls the operation of the encoding processing and the decoding processing. Reference numeral 19 denotes a mode data buffer for temporarily storing the mode data in both the encoding and decoding operations. Reference numeral 20 denotes a code word assigning/detecting circuit which assigns and outputs a code word corresponding to the mode data when the system is in the encoding operation, and converts a received code word to the mode data when the system is in the decoding operation. The circuit 20 is publicly known. Reference numeral 21 denotes a code data buffer which is provided for matching the processing speed to communication lines or a filing device.

Next, the operation of encoding and decoding of the circuit shown in FIG. 1 will be described.

First, referring to FIG. 2 to FIG. 6, the operation of encoding will be described.

Figure 2:
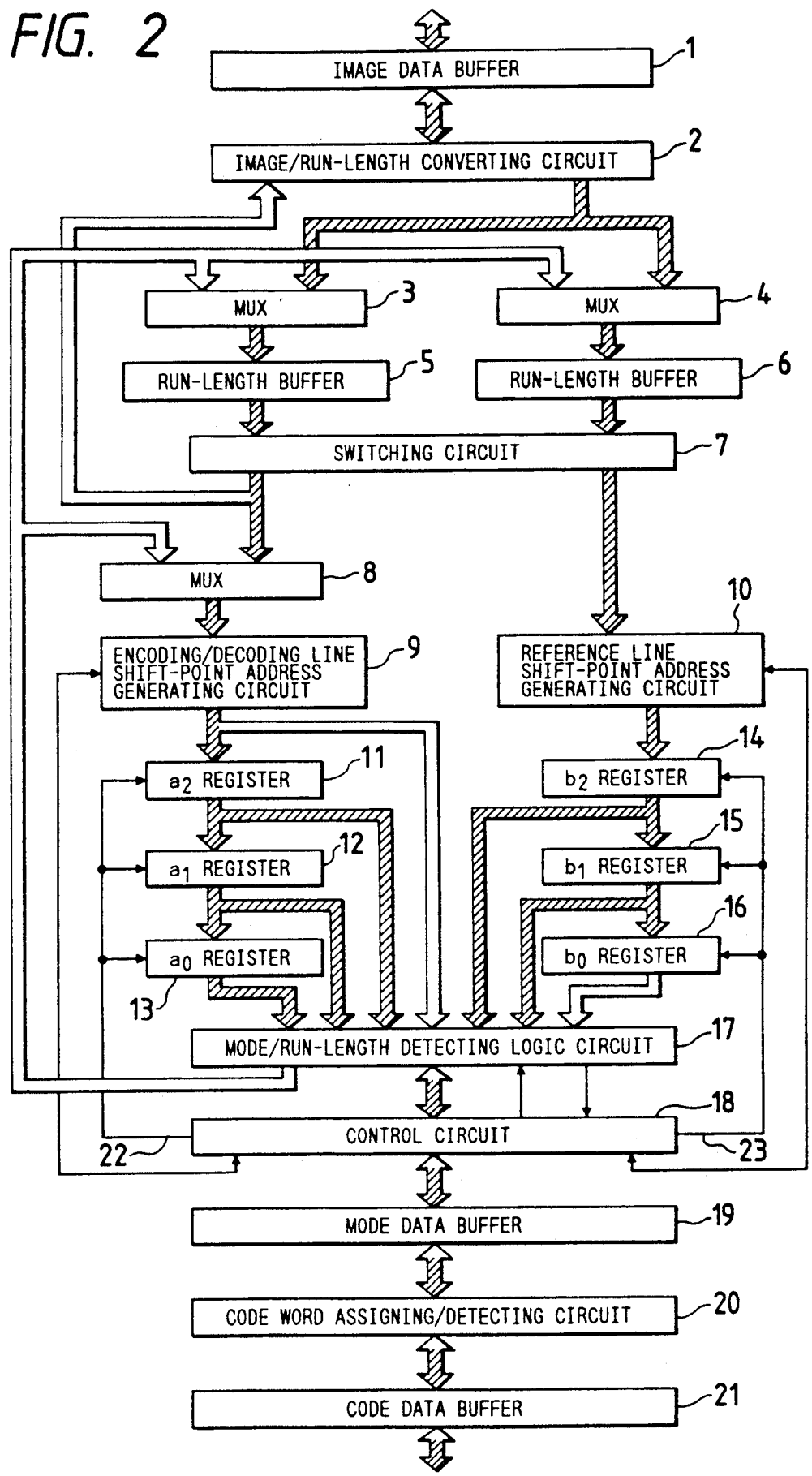
FIG. 2 is a diagram showing data paths in an encoding operation.
Figure 5:
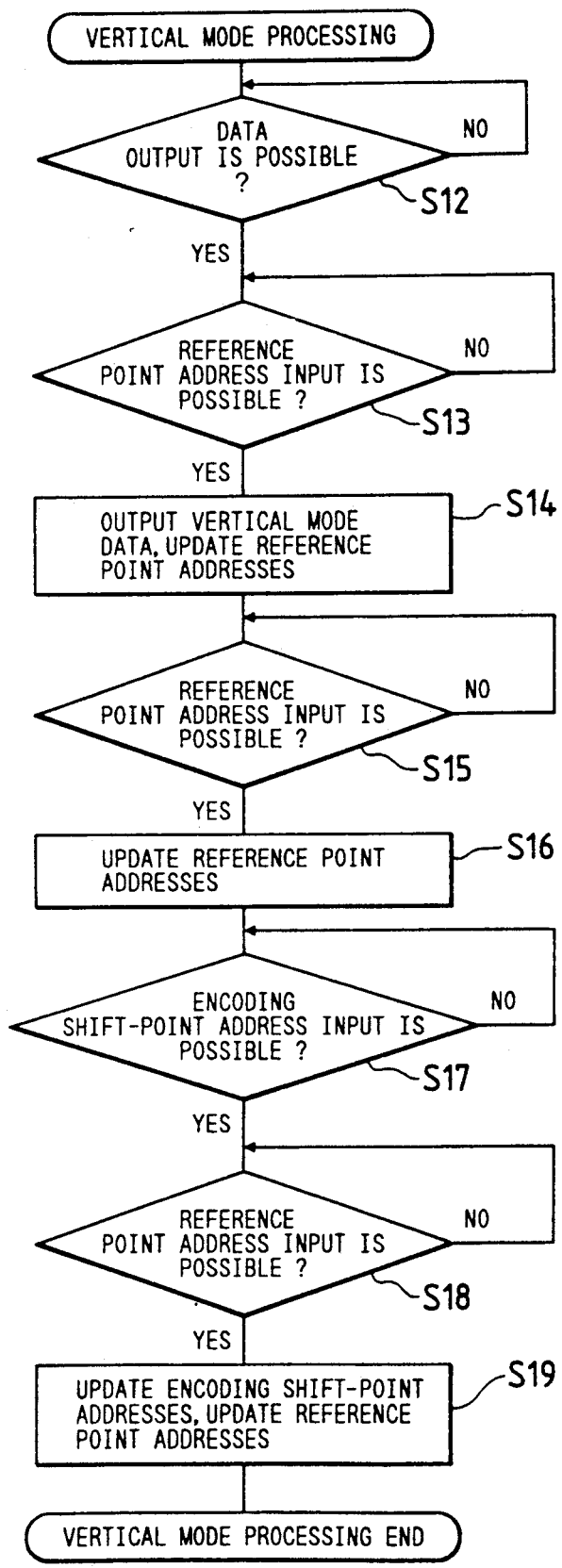
FIG. 5 is a diagram showing a flow chart for the vertical mode in the encoding processing.
Figure 6:
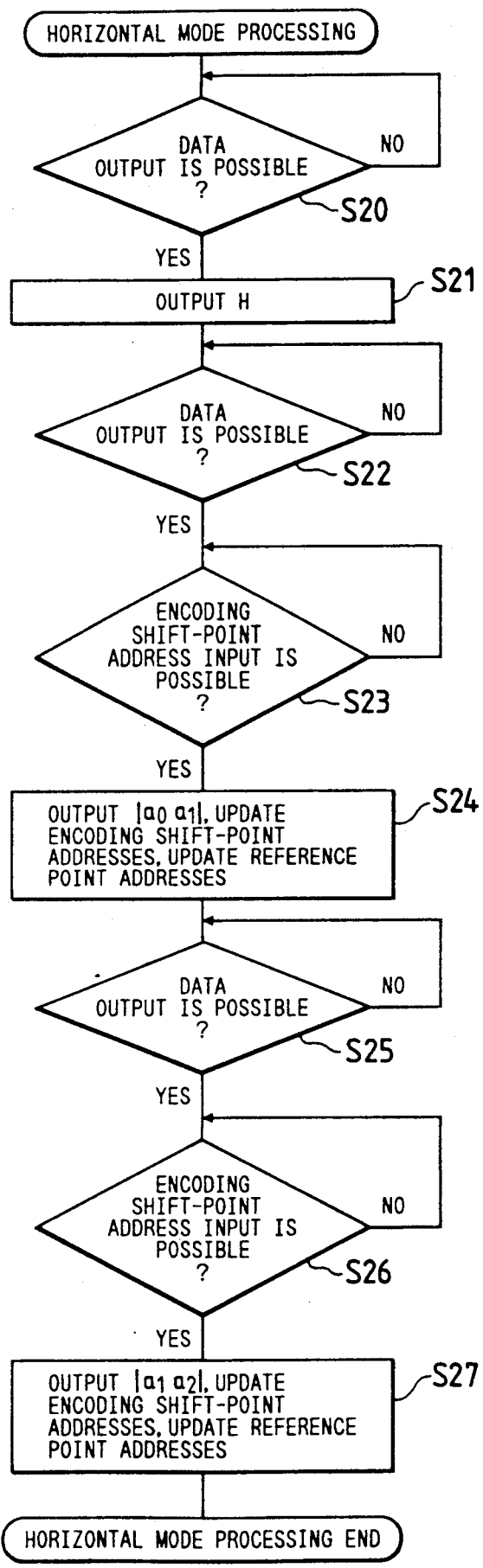
FIG. 6 is a diagram showing a flow chart for the horizontal mode in the encoding processing.

FIG. 2 is a diagram showing data paths in the encoding operation in which the data flow is controlled so as to follow the direction of the hatched arrows shown in the figure. FIG. 3 shows an overall flow chart of the encoding processing, and FIG. 4, FIG. 5 and FIG. 6 show flow charts for the pass mode processing, the vertical mode processing and the horizontal mode processing, respectively.

The processing shown in FIG. 3 starts when the shift-point address is stored in each of the registers 11, 12, 13, 14, 15 and 16, respectively. The shift-point addresses of the reference line can be obtained in the reference line shift point address generating circuit 10 by sequentially adding the input run-length data of the reference line. The shift-point addresses of the encoding line can be obtained by sequentially adding the input run-length data of the encoding line in the encoding/decoding line shift point address generating circuit 9. Moreover, these encoding-line shift-point addresses and reference line shift-point addresses are controlled to be generated mutually independently and simultaneously.

Step S1 (the expression "step" will be omitted and hence will be described simply as S1 hereinafter), judges whether the address of the shift point $a_0$ is equal to the picture element number of one line WL. This processing can be accomplished by comparing in the mode/run-length detecting logic circuit 17, under the control of the control circuit 18, the contents stored in the $a_0$ register 13 and the WL value set in advance. If this condition is satisfied, the processing is judged to be completed since the encoding for one line is finished. If not, the processing in S2 will be carried out next. The processing of S2 is for judging whether a mode in the encoding operation is the pass mode, which can be accomplished by judging in the control circuit 18 the result of comparison between the contents of the $a_1$ register 12 and the contents of the $b_2$ register 14 in the mode/run-length detecting logic circuit 17. When a current mode is judged to be the pass mode in S2, a passmode processing will be started in S3, but when it is judged oppositely, a processing of S4 will be executed. The processing of S4 is for judging whether a mode in the encoding operation is the vertical mode or the horizontal mode, which can be accomplished by judging in the control circuit 18 the result of comparison in the mode/run-length detecting logic circuit 17 between the contents of the $a_1$ register 12 and the $b_1$ register 15. When it is judged in S4 that a current mode is the vertical mode, the vertical mode processing will be started in S5, whereas when it is judged to be the horizontal mode, the horizontal mode processing will be started in S6. Upon completion of the pass mode processing in S3, the vertical mode processing in S5 or the horizontal mode processing in S6, the processing goes back to $S_i$, and the steps described above are repeated.

What has been given above explains the overall flow of the processing. As is clear from the constitution of the device shown in FIG. 2, the contents of the six registers can be input in parallel to the mode/run-length detecting logic circuit 17, so that the judging processings in S1, S2 and S4 can be carried out in a single step by incorporating a plurality of comparators in the mode/run-length detecting logic circuit 17, which will improve the processing speed. It is to be noted that special encoding processings such as an encoding processing for the first line, and encoding processings for the starting end and the terminating end have to be executed prior to the ordinary encoding described above. However, these processings can be accomplished by the known means disclosed in above-mentioned Japanese Patent Application Laid-Open No. 122282/1984 or in the CCITT Report, so detailed descriptions about them will be omitted.

Figure 13A:
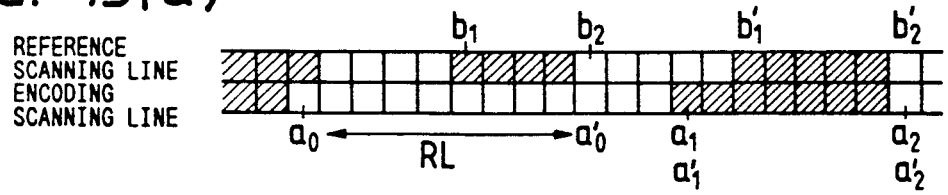
FIGS. 13(a)-(c) are diagrams for explaining the modes.

When a current mode is judged to be the pass mode in $S_3$, the pass mode processing shown in FIG. 4 will be started. In the pass mode processing, first in S7 it is judged whether the control circuit 18 is in the state being capable of outputting the mode data to the mode data buffer 19. Then, it is judged in S8 whether the reference line shift-point address generating circuit 10 is in the state being capable of outputting the next reference point address to the $b_2$ register 14. These processings are required for synchronization, in which the judgement is performed in the control circuit 18. If it is judged in S7 that the control circuit 18 is in the state capable of outputting the mode data, and in S8 that the $b_2$ register 14 is ready to receive the next reference point address of the reference line, when the control circuit 18 outputs in S9 the pass mode data P and updates the reference point addresses of the reference line by outputting one clock signal to the signal line 23. Next, the control circuit 18 judges in S10 whether the $b_2$ register 14 can receive the next reference point address, and if it is found to be possible, the reference point addresses are updated once more in S11 by one clock signal provided to the signal line 23. Using the case of FIG. 13(a) as an example, in the pass mode, the address of the new reference point $b_1$ ($b_1'$ of FIG. 13(a)) has to be chosen to be an address of the reference point immediately to the right of the reference point $b_2$ of the preceding encoding. Therefore, by outputting a total of two clock signals to the signal line 23 by the processings in S9 and S11, the address $b_2$ in FIG. 13(a) is stored in the $b_2$ register 16, the address of $b_1'$ in FIG. 13(a) is stored in the $b_1$ register 15, and the address of $b_2'$ in FIG. 13(a) is stored in the $b_2$ register 14. In contrast, no clock signal is input to the signal line 23, so that there will be no change in the contents of the data that are stored in the registers 11, 12 and 13. With the finish of the processing in S11, the pass mode processing is completed and the processing returns to the flow shown in FIG. 3.

As described above, since updating of the reference point addresses of the reference line required the pass mode processing can be completed in two steps, it is possible to reduce the processing time.

Figure 13B:
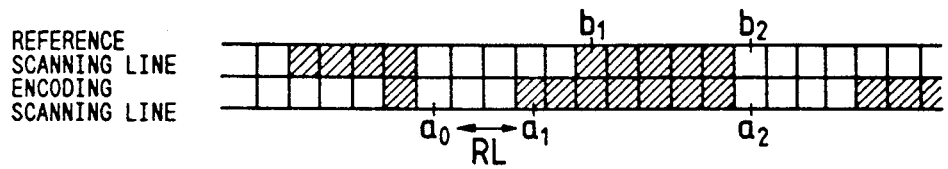

When a current mode is judged to be the vertical mode in S4 in FIG. 3, the vertical mode processing shown in FIG. 5 will be started. When the vertical mode processing is started, synchronization is established in S12 and S13 in the similar manner to the processings explained in conjunction with FIG. 4, and the processing in S14 is next executed. In S14, first the control circuit 18 sends the vertical mode data to the mode data buffer 19 based on the relationship between the contents of the $a_1$ register 12 the $b_1$ register 15, which was detected by the mode/run-length detecting logic circuit 17, and then updates the reference point addresses by outputting one clock signal to the signal line 23. The vertical mode data that is output to the mode data buffer 19 is, in the case of FIG. 13b, VL(2). When S14 is completed, the control circuit 18 waits in S15 until the next reference point address of the reference line become allowed to be input. This is a processing provided for the reason that the data prepared in S13 has already been used in updating the reference point addresses once in S14, so that it is necessary to wait until new reference point address data to be used in the next processing is generated. When the input of a new reference-point address becomes possible in S15, the control circuit 18 updates the reference point addresses by outputting a clock signal to the signal line 23. This is the processing of S16. Next, the control circuit 18 waits until a new shift-point addresses on the encoding line is prepared in S17, and further waits in S18 until a new shift-point address of the reference line is prepared. When the both new shift-point addresses are prepared, the control circuit 18 executes a processing of S19. In S19, the control circuit 18 outputs one clock signal to each of the signal lines 22 and 23, and updates the contents of each register to complete the vertical mode processing.

It is to be noted that in the vertical processing shown in FIG. 5, the updating of the register contents is carried out once for the shift-point addresses of the encoding line and three times for the shift-point addresses of the reference line, but it may be once for the both lines. In short, what is needed is to appropriately update the shift-point addresses for the next processing.

When a current mode is judged to be the horizontal mode, the horizontal mode processing shown in FIG. 6 is started. The control circuit 18 waits in S20 until the mode data becomes possible to be output, and when the output becomes possible, the letter H is output to the encoding part in S21. In the horizontal mode, as described above, the letter H indicating the horizontal mode and two run-length data have to be output as the mode data. Therefore, first, the letter H is output in S21. After outputting H, the control circuit 18 waits in S22 until the next data, namely, the first run-length data, is possible to be output, and further waits in S23 until the next shift-point address of the encoding line is generated and allowed to be input. When these conditions are in order, S24 is executed. In S24, the control circuit 18 outputs $|a_0a_1|$ detected in the mode/run-length detecting logic circuit 17 to the mode data buffer 19 as the first run length data. Further, in order to generate the other run-length data, one clock signal is output to each of the signal lines 22 and 23 to update the contents of each register. Next, the control circuit 18 enters another waiting state, and when the conditions of S25 and S26 are in order, it outputs the second run-length data $|a_1a_2|$ to the mode data buffer in S27, and updates the contents of each register by outputting one clock signal to each of the signal lines 22 and 23. As a result of the address updating processing in S27, when the positional relationship between the shift point $a_0$ of the encoding line and the shift point $b_1$ of the reference line is in a state to satisfy the definition, the horizontal mode processing is completed.

What has been presented above is the horizontal mode processing. It is, however, necessary to take care in determining from which register the address data of the shift point $a_0$ to be used in obtaining the run-length data should be obtained. Ordinarily, the address data stored in the $a_0$ register 13 may be used. However, when a horizontal mode processing is carried out after a pass mode processing, the contents of the $a_0$ register 13 cannot be used. This is because, as was mentioned in conjunction with FIG. 13(a), in the case of the pass mode, the shift point $a_0$ is changed to the position of the shift point $b_2$ in the preceding encoding processing (position $a_0'$ in FIG. 13(a)). Now, the addresses of the shift points of the reference line are updated twice as mentioned above, so that the address used for $b_2$ in the preceding encoding processing is stored in the $b_0$ register 16. Accordingly, when a run-length data is to be generated after a pass mode processing, it the data stored in the $b_0$ register 16 should be used as the address of $a_0$. The control circuit 18 discriminates whether the pass mode processing has been executed before starting the horizontal mode processing. Therefore, the selection of the register under discussion should be carried out easily.

So far, the discussion has been limited to the ordinary processing. As a special process, the case of the retrogression of a reference point will now be described in the following.

Figure 13C:
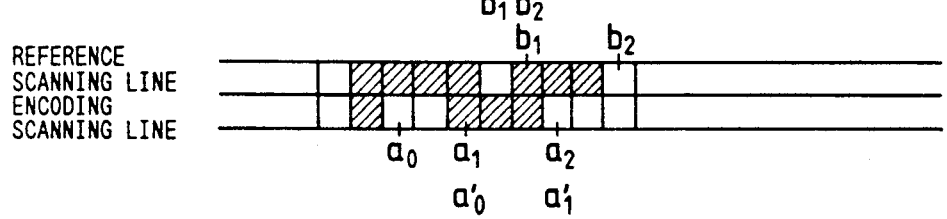
Figure 14:
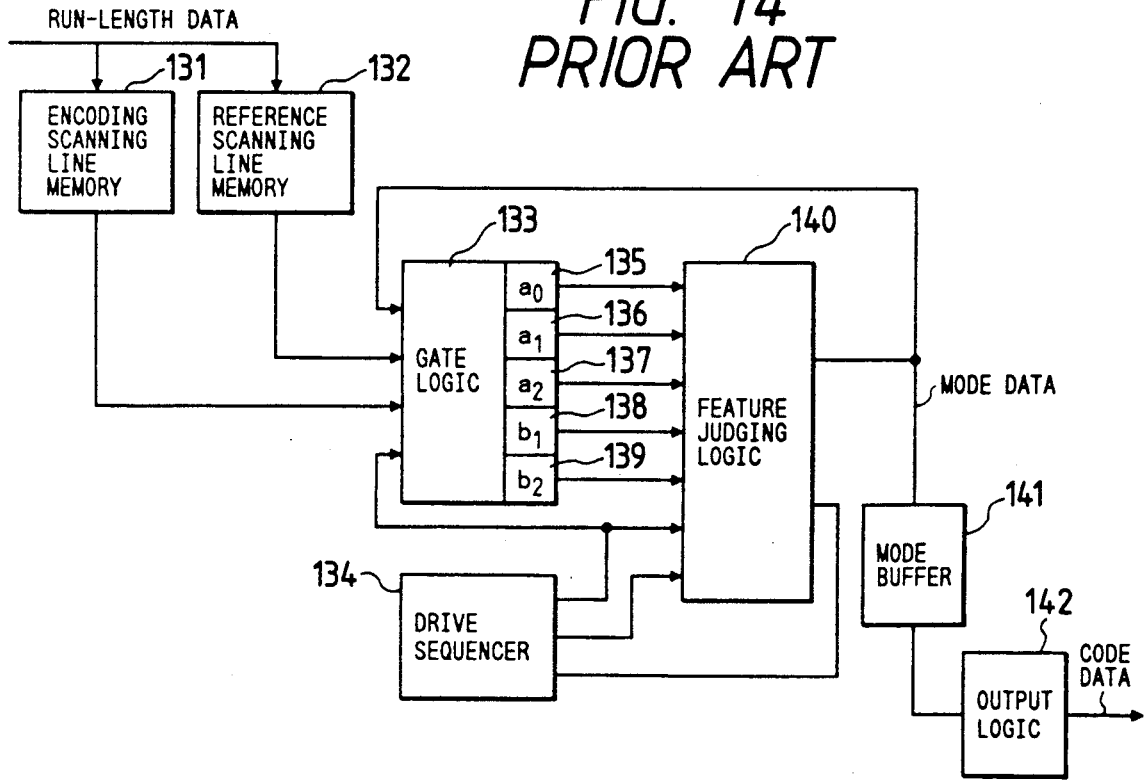
FIG. 14 is a diagram showing the constitution a prior art encoding device.

The retrogression of a reference shift point becomes problematic in the vertical mode. In this case, when a vertical mode data is output in S14, an address data which is stored in the $b_0$ register 16 is used as the address of the shift point $b_1$. This is because, as can be seen from FIG. 13(c), the position of the new shift point $b_1$ in the case of the retrogression will be the position of $b_0$ in the preceding encoding processing. The judgment as to whether the reference point has retrogressed can be determined by detecting the positional relationship between the shift points $a_0$ and $b_0$ and judging if $a_0 < b_0$. Accordingly, the above judgment processing needs be done at an appropriate point in the flow of FIG. 5.

It should be noted that what kind of circuit should be used to generate the shift-point address of the encoding line and the reference line has not been explained in the foregoing description. However, a variety of constitutions of such a circuit have been known, and a circuit with any constitution may be used in the present invention so long as it is capable of generating shift-point addresses. The same will also apply to the code word assigning/detecting circuit 20.

In the foregoing, the operation of the encoding processing has been described. Next, the decoding processing will be explained. As will be described below, the data paths and the control mode for the decoding operation are different, needless to say, from those for the encoding operation. The switching of the data paths and the control mode is performed by the control circuit 18.

Figure 7:
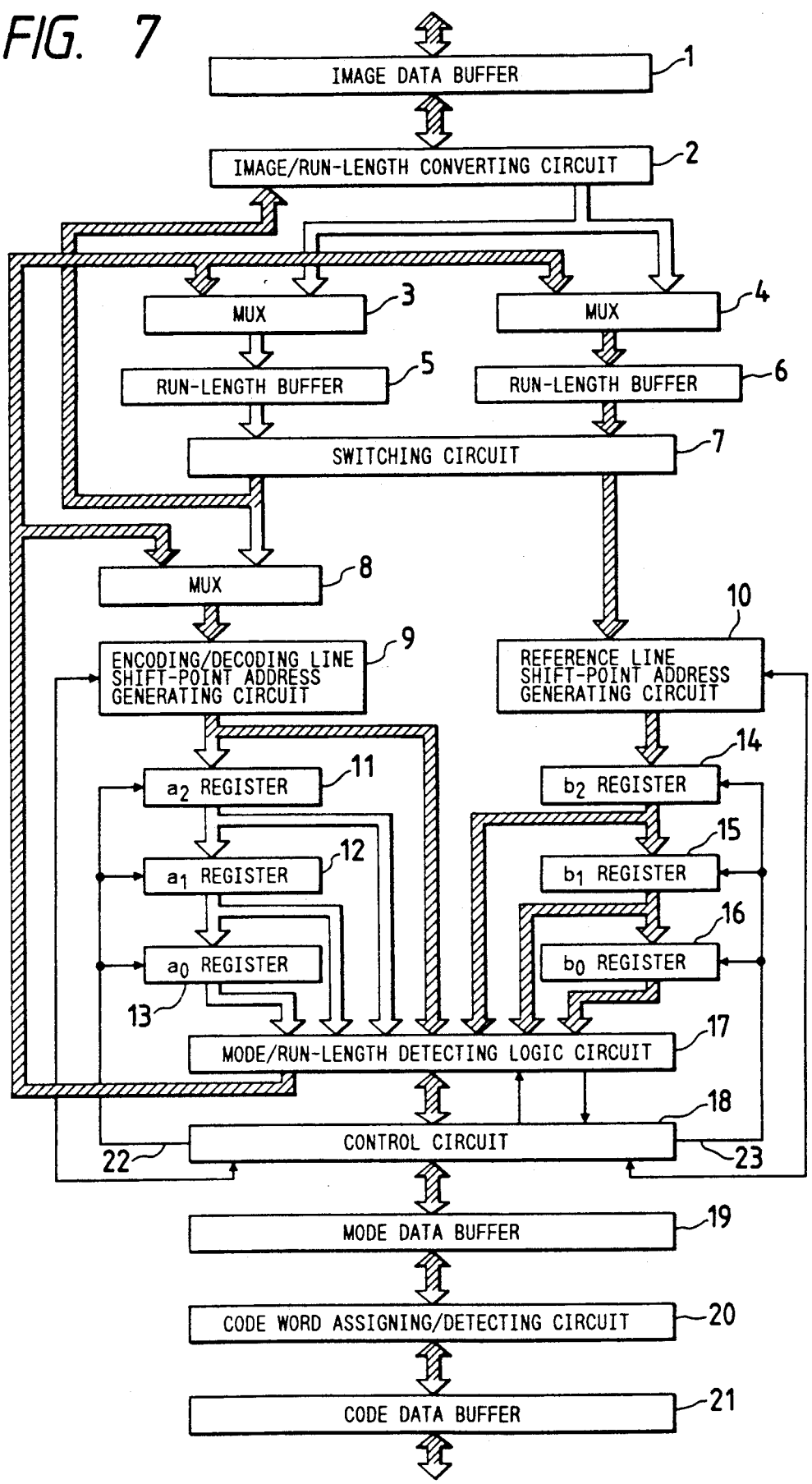
FIG. 7 is a diagram showing data paths in a decoding operation.
Figure 11:
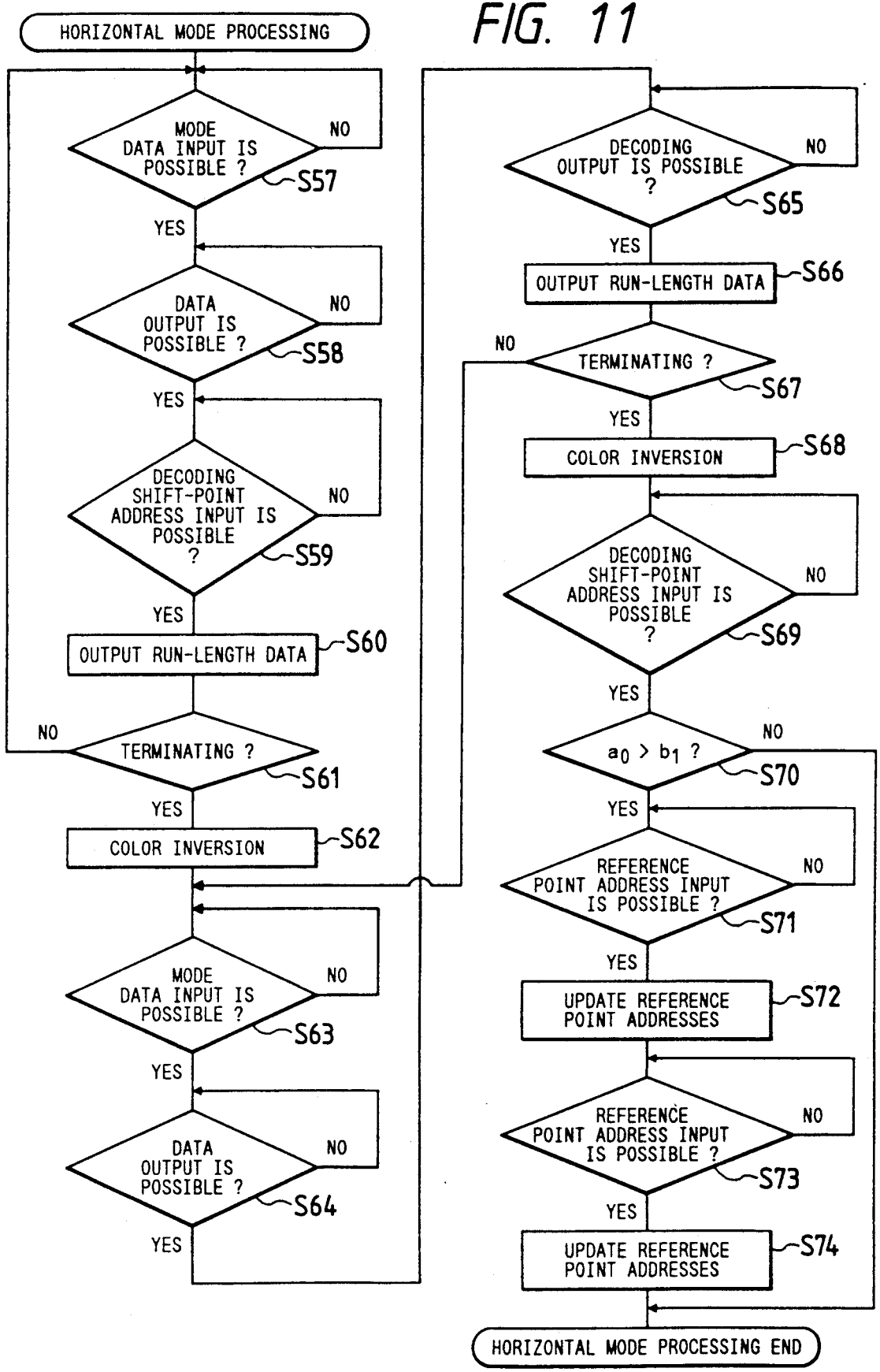
FIG. 11 is a diagram showing a flow chart for the horizontal mode in the decoding, processing.

FIG. 7 is a diagram for showing data paths in the decoding operation, where the data are controlled so as to flow in the direction of the hatched arrows in the figure. Further, FIG. 8 shows an overall flow chart of the encoding processing, and FIG. 9, FIG. 10 and FIG. 11 show flow charts for the pass mode processing, the vertical mode processing and the horizontal mode processing, respectively.

In the decoding processing, there is required only one shift-point address of the decoding line. A register 11, 12 or 13 from which the shift-point address should be obtained, may be determined accordingly. In the following, however, the output of the encoding/decoding line shift-point address generating circuit 9 will be employed as the shift-point address to permit high-speed decoding processing. Accordingly, the output of the encoding/decoding line shift-point address generating circuit 9 is the address of the shift point $a_0$ that will be described below. Further, in the decoding processing, the addresses of the shift points of the decoding line can be obtained in the encoding/decoding line shift-point address generating circuit 9 by sequentially adding the run-length data that are output from the mode/run-length detecting logic circuit 17. Moreover, the addresses of the shift points of the reference line can be obtained by delaying by one line length the run-length data provided from the mode/run-length detecting logic circuit 17 in the run-length buffer 5 or 6, and sequentially adding the delayed data in the reference-line shift-point address generating circuit 10. The shift-point addresses of the decoding line and the reference line are generated mutually independently and simultaneously, which is analogous to the case of the encoding processing.

Figure 8:
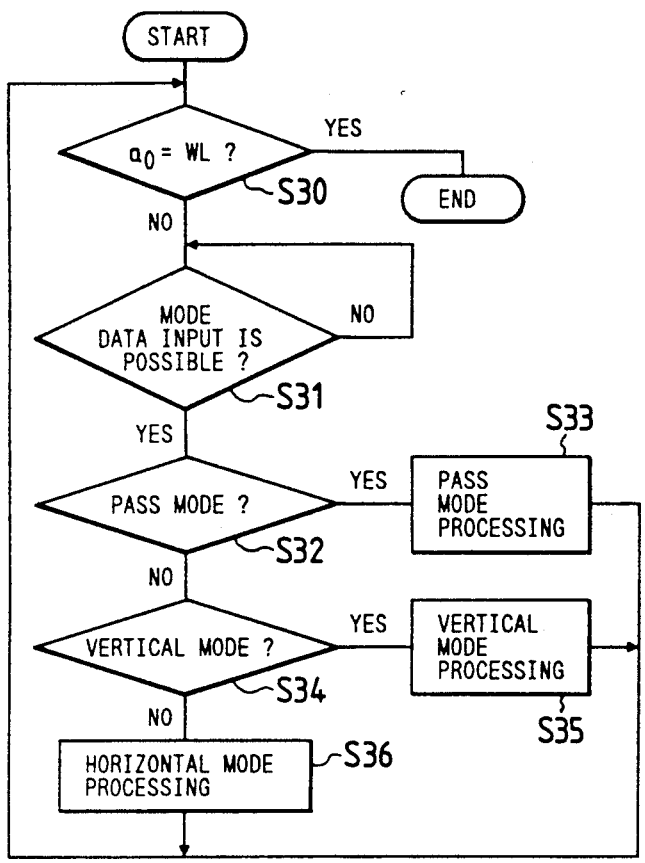
FIG. 8 is a diagram showing a flow chart of a decoding processing.

FIG. 8 is an overall flow chart for the decoding processing. First, it is judged in S30 whether the output of the encoding/decoding line shift-point address generating circuit 9 is equal to the picture element number of one line WL. If it is equal to WL, meaning that the decoding for one line has been completed, the processing is finished. If it is not, S31 will be executed. This judgement is performed in the mode/run-length detecting logic circuit 17 under the control of the control circuit 18. In S31, if the mode data is possible to be input to the control circuit 18, the control circuit 18 receives the data. In other words, since the pass mode data of P, the vertical mode data of V, or the horizontal mode data consisting of H and run-length data is required to carry out the decoding, the processing for receiving the above data is carried out in S31. Next, the control circuit 18 judges in S32 whether the received data is the pass mode data P, and if it is P, the pass mode processing is carried out in S33, and if it is not, the control circuit 18 judges in S34 whether a current mode is the vertical mode or the horizontal mode. When it is judged to be the vertical mode in S34, the vertical mode processing is carried out in S35, and when it is not, the horizontal mode processing is carried out in S36. When the pass mode processing in S33, the vertical mode processing in S34 or the horizontal mode processing in S36 are completed, the processings of S30 and thereafter is repeated. The judgments of S32 and S34 can be executed by discriminating the input mode data. That is to say, in the case of the pass mode, since the code "P" that represents the pass mode is input, it suffices to recognize that code. The similar procedure applies to the vertical mode and the horizontal mode.

Figure 9:
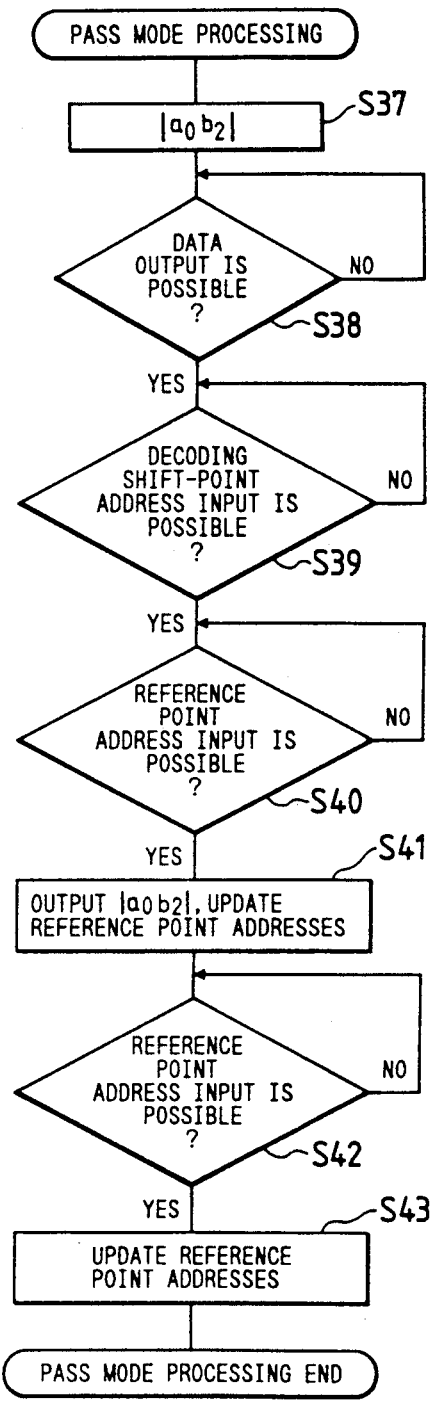
FIG. 9 is a diagram showing a flow chart for the pass mode in the decoding processing.

A flow chart for the pass mode processing of S33 in FIG. 8 is shown in FIG. 9. Taking the case of FIG. 13(a) as an example, when the path mode processing starts, first $|a_0b_2|$ is computed in S37. Since in the pass mode the new shift point $a_0$ falls on the position of the shift point $b_2$ used in the preceding encoding, as mentioned before, the run length RL shown in FIG. 13(a) can be found by computing in S37 the distance between $a_0$ and $b_2$ in the preceding encoding. Note that the shift-point addresses to be used are the addresses of $a_0$ and $b_2$ in FIG. 13(a). When the run length has been calculated, it is judged in S38 whether the run-length data can be output from the mode/run-length detecting logic circuit 17. If it can be output, it is judged in S39 whether a new address for the shift point $a_0$ of the decoding line is prepared, and if the answer is affirmative, it is judged in S40 whether new address for the reference shift point is prepared. S41 is carried out if it is prepared. The processings in S38, S39 and S40 are for taking synchronization. In S41, the mode/run length detecting logic circuit 17 outputs the run-length data computed in S37, and the control circuit 18 outputs one clock signal to the signal line 23 to update the contents of the $b_2$ register 14, the $b_1$ register 15 and the register $b_0$ 16. When S41 is completed, the control circuit 18 waits in S42 until a new address of the reference shift point is prepared again. When the new address is prepared, the control circuit 18 updates the contents of the three registers 14, 15 and 16 by outputting one clock signal to the signal line 23. That the addresses of the reference shift points are updated twice in S41 and S43 corresponds to the fact that the updating of the addresses of the reference shift points is carried out twice is S9 and S11 of the pass mode processing (FIG. 4) in the encoding operation.

The pass mode processing is thus completed and the flow goes back to S30 in FIG. 8.

Next, referring to the flow chart in FIG. 10, the vertical mode processing S35 in FIG. 8 will be described. When the vertical mode is started, the mode/run-length detecting logic circuit 17 carries out the calculation in S44, i.e., $|a_0b_1| \pm V$, by taking in the address of the decoding shift point $a_0$ which is the output of the encoding/decoding line shift-point address generating circuit 9 and the contents of the $b_1$ register 15, and further taking in the value of VR or VL, namely, the value of the interval between the shift points $a_1$ and $b_1$. Taking the case of FIG. 13(b) as an example, the left side portion of $a_0$ is already decoded and what is to be calculated here is the run length (RL in FIG. 13(b)) between the preceding position of $a_0$ ($a_0$ in FIG. 13(b)) and the new position of $a_0$ ($a_1$ in FIG. 13(b)). It is obvious that the desired run length can be obtained by the calculation in S44. In this calculation, if the mode is VR, namely, when $a_1$ exists to the right of $b_1$, the value V is added, whereas if the mode is VL, the value V is subtracted. In the case of V(0), either the addition or subtraction may be executed. When the run-length data is computed in S44, synchronization is taken in S45 and S46, and then the processing of S47 is executed. In S47, the mode/run-length detecting logic circuit 17 outputs the run length data calculated in S44, and the control circuit 18 executes the color inversion. This is because the color (white or black) associated with the output run-length data changes alternately. The processings starting from S48 are for updating the reference shift-point addresses for the next decoding. Since the manner of updating is different in the case where the reference shift point is retrogressed and in the case where not retrogressed, the flow is branched at S49.

First, the control circuit 18 waits in S48 until a new address for the shift point $a_0$ is prepared, and when it is prepared, the address is output from the encoding/decoding line shift-point address generating circuit 9. In reference to the example of FIG. 13(b), the address which has been stored before updating is the address $a_0$ in FIG. 13(b). By adding to that address the run-length output of S47 there is obtained a new address for $a_0$ (position of $a_1$ in FIG. 13(b), which is output. Next, in S49, the positional relationship between new $a_0$ and $b_2$ is judged. If the condition $a_0 < b_2$ is satisfied, it is judged that the reference shift point is retrogressed. If not satisfied, it is not retrogressed. When the reference shift points are not retrogressed, the control circuit 18 waits in S50 until the next reference shift point is prepared, and when they are prepared, the contents of the registers 14, 15 and 16 are updated. Further updating the contents of the registers 14, 15 and 16 two times in S52 and S53, and in S57 and S58, the vertical mode processing is completed. On the other hand, when judged to be the retrogression is judged in S49, the positional relationship between $a_0$ and $b_1$ is judged next in S54, and when it is judged that $a_0$ is not on the left side of $b_1$, the contents of the registers 14, 15 and 16 are updated once in S57 and S58 to complete the vertical mode processing. When $a_0$ is judged to be on the left side of $b_1$ in S54, the positional relationship between $a_0$ and $b_0$ is judged in S55. When it is judged that $a_0$ is on the left side of $b_0$ in S55, the vertical mode processing will be completed by carrying out the retrogression processing in S56. On the other hand, when $a_0$ is judged not to be on the left side of $b_0$, the vertical mode processing is completed by updating the contents of the registers 14, 15 and 16 once in S57 and S58. The retrogression processing that is executed in S56 is a processing in which the contents of the registers 14, 15 and 16 are not updated, and, in the next mode detection, the contents of the $b_0$ register 16 is used as the address of the reference point $b_1$ and the contents of the $b_1$ register 15 is used as the address of the reference point $b_2$.

By carrying out such updating of the reference points, it is possible to find out the same reference points as those in the encoding, by which it becomes possible to carry out correct decoding.

When it is judged in S34 in FIG. 8 that a current mode is the horizontal mode, the horizontal mode processing is carried out in S36. A flow chart of the horizontal mode processing is as shown in FIG. 11. Referring to FIG. 11, when the horizontal mode processing is started, the control circuit 18 waits in S57 until a run-length data is possible to be input, and when it becomes possible, a first run-length data is input. Next, the cpmtrp; circuit 18 waits in S58 until the mode/run-length detecting logic circuit 17 becomes possible to output the run-length data. Next, the control circuit 18 waits until a new address for the shift point $a_0$ is prepared in S59. When a new address for $a_0$ is prepared, S60 is executed. In S60, the mode/run-length detecting logic circuit 17 outputs the input run-length data as it is. The run-length data is arranged such that after several consecutive makeup signal, whether, the input data is a terminating signal is sent. Therefore, the judgement whether the input data is a terminating signal or not is executed in S61, and the above processings are repeated until a terminating signal is detected. When a terminating signal is detected in S61, the color of the run length data is inverted in S62. This means that the first run-length data has been output. By executing S63 to S68 which are identical to the processings from S57 to S62 in the above, the second run-length data is output. Since in the encoding with the horizontal mode, two run-length data are generated, in the decoding with the horizontal mode the run-length data that are input in the above manner need only be output as they are. The processings in S69 and thereafter are updating processings of the reference points for the next decoding. First, the control circuit 18 waits in S69 until a new $a_0$ is prepared, and when a new $a_0$ is prepared, it is output from the encoding/decoding line shift-point address generating circuit 9. Next, the positional relationship between the new $a_0$ and the preceding reference point $b_1$ is judged. If it is judged here that $a_0$ is on the left side of $b_1$, the horizontal mode processing is finished. However, if it is judged that $a_0$ is on the right side of $b_1$, the reference points are updated two times in S71, S72 and in S73, 74, completing the horizontal mode processing.

From what has been described above, it will be clear that it is possible to execute the two-dimensional encoding and decoding by the use of a single circuit through switching of the control mode and the data paths between the encoding and decoding processings.

Figure 12:
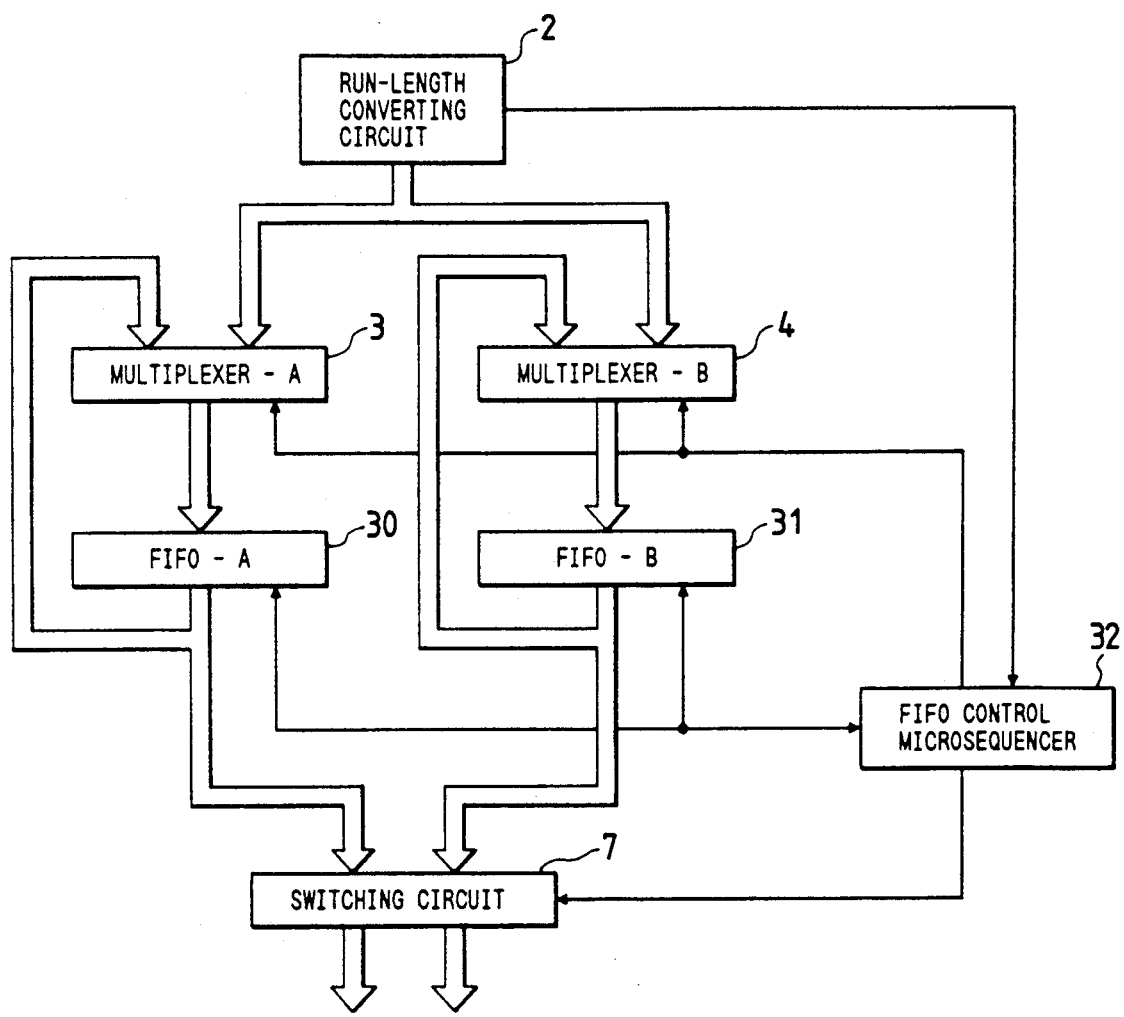
FIG. 12 is a diagram showing a specific constitution of run-length buffers.

Next, referring to FIG. 12, the run-length buffers 5 and 6 in FIG. 1 will be described. In FIG. 12, components identical to those in FIG. 1 are given identical reference numerals. In addition, the operation for encoding alone will be described in the following, but it will be obvious to those skilled in the field that the circuit works similarly in the decoding operation.

Now, an image data obtained by an appropriate device such as an image reader that is not shown in FIG. 1 is input to the image/run-length converting circuit 2 via the imaged data buffer 1. The run-length data generated by the converting circuit 2 is provided to the buffer 5 or 6 via a multiplexer 3 or 4, and stored in the buffer 5 or 6. Each run-length buffer 5 or 6 has a capacity for storing one line portion of the data, and a run-length data of the encoding line is stored in one of the run-length buffers and a run-length data of the reference line is stored in the other buffer. Assuming that currently a run-length data of the encoding line is stored in the run-length buffer 5 and a run-length data of the reference line is stored in the run-length buffer 6, since the present encoding line will become a reference line in the encoding of the next line, it is clear that it is desirable to use the run-length data of the encoding line currently stored in the run-length buffer 5 as a run-length data for the next reference line. Therefore, in the present image information encoding/decoding device, it is decided to employ as shown in FIG. 12 a FIFO (first in first out) circuit as the run-length buffers 5 and 6 in FIG. 1, also taking the ease of control into consideration.

The operation of the circuit shown in FIG. 12 is as follows. In a two-dimensional encoding system such as the MMR system, a virtual full-white line is provided before the first line for the purpose of encoding the first line. Therefore, when the processing is started, the image/run-length converting circuit 2 first generates a full-white run, and the full-white run is written, for example, in the FIFO-A 30 via the multiplexer-A 3. When the full white run is stored in the FIFO-A 30, the FIFO to which is to be input a next run-length data from the image/run-length converting circuit 2, is switched from the FIFO-A 30 to FIFO-B 31 under the control of a FIFO control microsequencer 32, and the first line run-length data of the actual image is stored in the FIFO-B 31 via the multiplexer-B 4. At this time, since the run-length data stored in the FIFO-A 30 becomes a run-length data of the reference line, the output of the FIFO-A 30 is input via the switching circuit 7 to the reference line shift-point address generating circuit 10 (FIG. 1) to be used for the generation of the addresses of the shift points of the reference line. At the same time, a run-length data of the next line generated in the image/run-length converting circuit 2 is provided to the FIFO-A 30 via the multiplexer-A 3. At this time, on the other hand, the output of the FIFO-B 31 is input to the encoding/decoding line shift-point address generating circuit 9 (FIG. 1) via the switching circuit 7 and the multiplexer 8 to be used for the generation of the shift-point addresses of the encoding line. The above-mentioned output is fed back and is written again in the FIFO B31 to be used as the data of the reference line for the next encoding. After the processing for the one line portion is completed, the switching circuit 7 is changed over such that the run-length data in the FIFO-A 30 is input via the multiplexer 8 to the encoding/decoding line shift-point address generating circuit 9, while the run-length data in the FIFO-B 31 is input to the reference line shift-point address generating circuit 10. The multiplexers 3 and 4, FIFOs 30 and 31, and the switching circuit 7 repeat the above operation under the control of the FIFO control microsequencer 32.

In the foregoing, an embodiment of the present invention was described. However, the present invention is not limited to the present invention but various modifications are possible. For example, although in the present embodiment two-dimensional encoding and decoding was taken as an example, but it will be clear to those skilled in the field that the present invention is also applicable to a one-dimensional encoding and decoding system such as the MH system.

As is clear form the above description, that in accordance with the present invention, an image information encoding device such as facsimile equipment and an image filing device can carry out two-dimensional encoding and decoding by the use of a single circuit, so that it becomes possible to reduce the scale of the circuit. At the same time, registers for storing the shift-point addresses are pipeline-connected and the shift-point addresses can be updated in one step, so that the speed of processing can be improved. Further, the $b_0$ register which has not been used previously is provided, so that processings at the time of the pass mode and the retrogression of the reference point can be easily accomplished. Moreover, as may be clear from the operations shown in FIG. 2 and FIG. 7, it is possible to carry out the shift-point address generation and the mode detection can be executed in parallel and simultaneously. Moreover, the shift-point addresses can be generated by simply imputting the run-length data sequentially, and by simply imputting the shift-point addresses to the mode/run-length detecting logic circuit in the order as they are, both of the mode and run-length detections can be accomplished. Therefore, it becomes possible to achieve the encoding processing and the decoding processing at high speed.

Moreover, the FIFO circuits are employed for the run-length buffers, so that the control of the system including the switching of the output data becomes easy, and the run-length data of the encoding line and the decoding line can be processed mutually independently and simultaneously, making it possible to carry out a high-speed processing. In other words, if ordinary RAMs are employed as line memories, it will be necessary to use a total of three memories, i.e., a memory for temporarily storing a run-length data, a memory for the encoding line, and a memory for the reference line, and also the switching processing between the memories for the encoding line and the reference line becomes complex. In contrast, the FIFO circuits can be operated mutually independently and simultaneously, so that it becomes possible to carry out a high speed processing with simple control.

What is claimed is:

1. An image information encoding/decoding device for carrying out two-dimensional encoding and decoding processings, comprising:
   (a) an image data buffer memory for receiving an image data in an encoding operation and outputting an image data in a decoding operation;
   (b) an image/run-length converting circuit for converting the image data received by said image data buffer to a run-length data in the encoding operation, and converting a run-length data to the image data in the decoding operation;
   (c) two run-length buffers each for storing one line portion of the run-length data, arranged such that while a run-length data of an encoding line or a decoding line is stored in one of said run-length buffers, a run-length data of a reference line is stored in the other;
   (d) an encoding/decoding line shift-point address generating circuit for generating encoding line shift-point addresses by sequentially adding the run-length data of the encoding line in the encoding operation, and generating decoding line shift-point addresses by sequentially adding decoded run-length data in the decoding operation;
   (e) a reference line shift-point address generating circuit for generating reference line shift-point addresses by sequentially adding the run-length data of the reference line;
   (f) pipeline-connected $a_2$, $a_1$ and $a_0$ registers for sequentially storing the encoding line shift-point addresses or the decoding line shift-point addresses that are generated in said encoding/decoding line shift-point address generating circuit;
   (g) pipeline-connected $b_2$, $b_1$ and $b_0$ registers for sequentially storing the reference line shift-point addresses that are generated in said reference line shift-point address generating circuit;
   (h) a mode/run-length detecting logic circuit for detecting a current operation mode based on the encoding line shift-point addresses and the reference line shift-point addresses and outputting a mode data in the encoding operation, and generating the run-length data based on an input mode data in the decoding operation;
   (i) a control circuit for switching a control mode and data paths between the encoding and decoding operations, and controlling the encoding operation or the decoding operation; and
   (j) a code word assigning/detecting circuit for assigning and outputting a code word that corresponds to the mode data in the encoding operation, and converting a received code word to the mode data in the decoding operation.

2. An image information encoding/decoding device as claimed in claim 1, wherein each of said two run-length buffers comprises a first-in-first-out circuit.

3. An image information encoding/decoding device as claimed in claim 1, wherein, in the encoding operation, when a horizontal mode processing is executed after a pass mode processing, said mode/run-length detecting logic circuit outputs a horizontal mode data using an address stored on said $b_0$ register.

4. An image information encoding/decoding device as claimed in claim 1, wherein, in the encoding operation, when retrogression of a reference line shift-point has occurred in a vertical mode processing, said mode/run-length detecting logic circuit outputs a vertical mode data using an address stored in said $b_0$ resister.

5. An image information encoding/decoding device as claimed in claim 1, wherein, in the decoding operation, said mode/run-length detecting logic circuit uses an output of said encoding/decoding line shift-point address generating circuit as an encoding line shift-point address.

* * * * *